Patented May 5, 1953

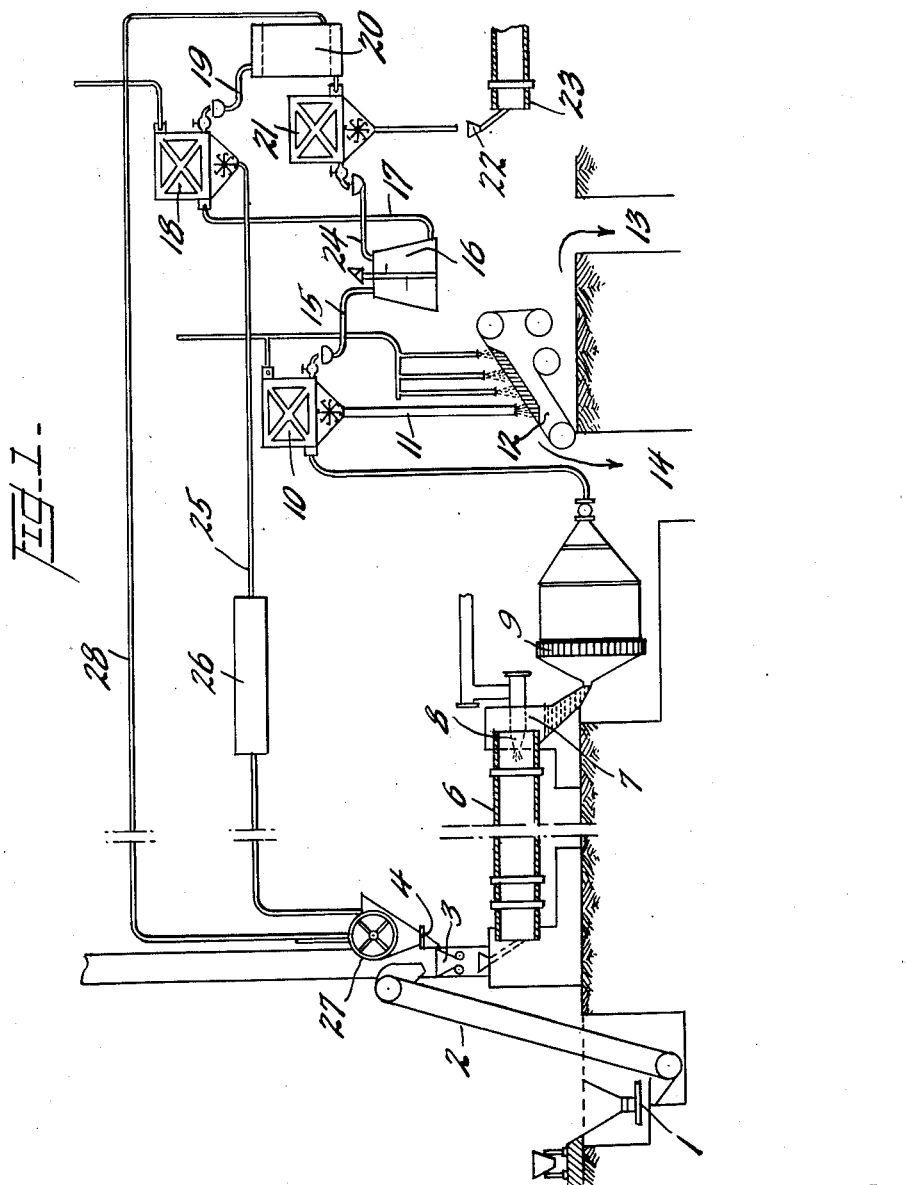

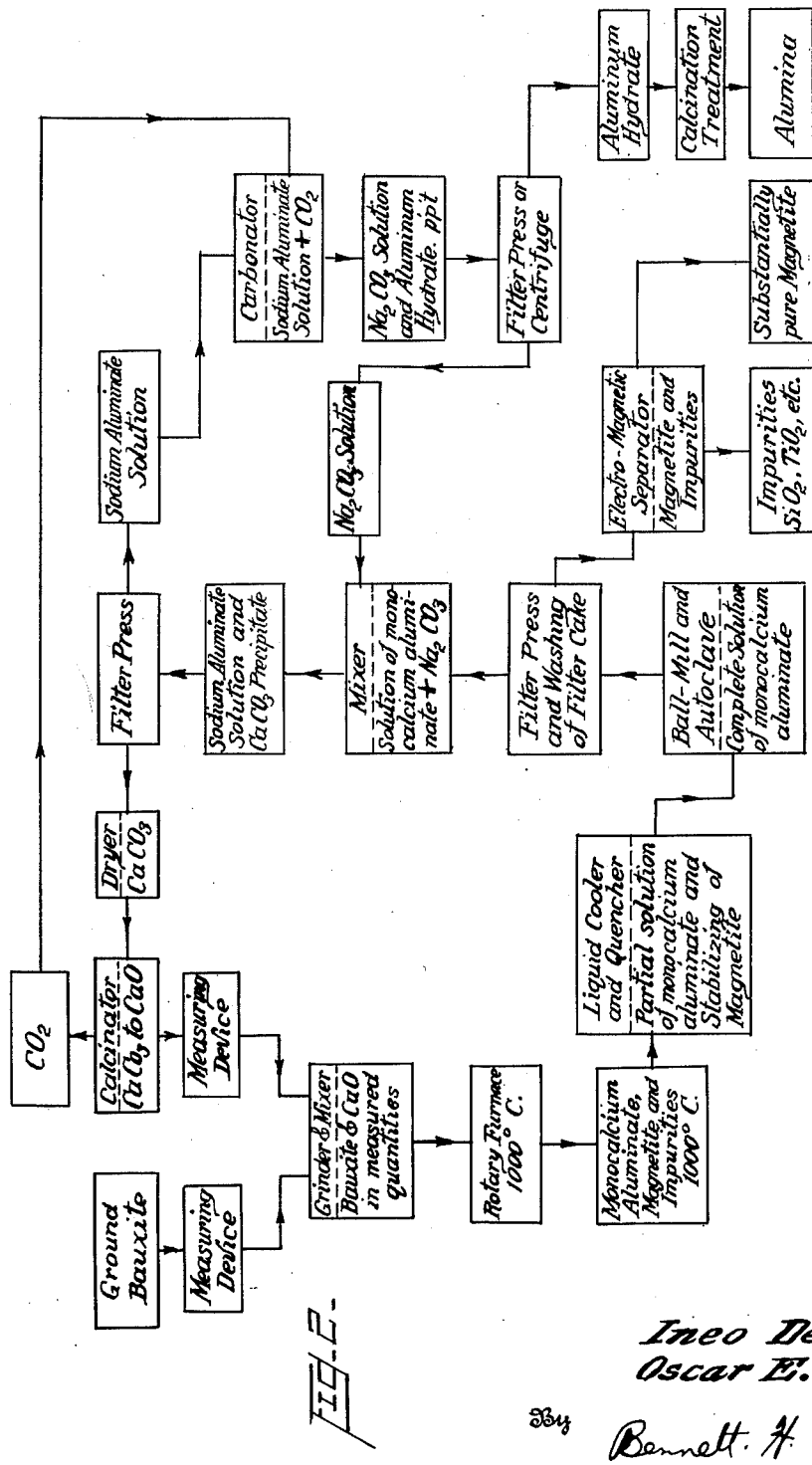

2,637,628

UNITED STATES PATENT OFFICE 2,637,628

PROCESS FOR THE TREATMENT OF BAUXITES

Ineo De Vecchis, Paris, France, and Oscar E. Ramuz, Lausanne, Switzerland, assignors of one-fourth to Guy H. Montmartin, New York, N. Y.

Application February 27, 1948, Serial No. 11,626
In France March 2, 1945

Section 1, Public Law 690, August 8, 1946
Patent expires March 2, 1965

13 Claims. (Cl. 23—141)

This invention relates to the art of beneficiating minerals available as a source of aluminum values, and more particularly, it pertains to the treatment of refractory materials containing alumina. In its preferred adaptation, the invention is directed to the recovery of alumina from bauxite in its various modifications, including within its novel scope features of procedure and apparatus.

Despite the many and diversified procedures contemplated in the beneficiation of alumina containing refractories, various difficulties and uncertainties have prevailed in the art. These have been manifested by shortcomings with respect to the facility, efficiency and economy of operation. Thus various types of bauxite have been regarded as industrially impracticable as a source of alumina in view of the technical problems and lack of economy attendant the separation of alumina from these minerals.

Illustratively bauxites of high siliceous and/or ferruginous content, whether or not they are rich in alumina, have been in effect discarded as essentially useless because of the difficulty of effecting the separation of the silica or iron oxide impurities from the alumina to afford a substantially pure product. Referring to the alkaline type of procedure usually relied upon for opening up alumina refractory materials, the objection to the siliceous and/or ferruginous bauxites is at least in part attributable to the tendency of the silica to form difficulty filterable alkali metal or alkaline earth metal silicates, and the objectionable tendency of iron oxides to form colloidal hydrates. These difficultly removable precipitates introduce procedural complications involving aggravated problems of filtration, and result in an unduly contaminated alumina product.

These problems apply even with respect to bauxites containing amounts of silica and/or iron oxides which do not preclude their adaptation in prevailing procedures. Thus the separation of difficultly removable precipitates constitutes a definite obstacle in the manipulative procedure and likewise adversely affects the operation of the apparatus. The function of the apparatus utilized in the filtration of colloidal materials by ordinary devices retards the operativeness of the process, usually by a progressive diminution of the rate of filtration, ultimately resulting in the clogging of the filter and to the same extent interfering with the washing of the precipitate in order to remove the soluble material therein. Accordingly, the continuity of the process is impaired and the efficiency of operation is substantially reduced.

Efforts have been made in prior art alkaline procedures to minimize the difficulty of separating alumina from silica by regulating the proportions of alkaline reagent to an extent intended to solubilize the alumina and form a predetermined type of alkaline silicate. Whether or not such procedures are desirable, they do not eliminate the difficulties of silica removal nor do they contemplate the effective separation of iron oxides by an expedient procedure. On the whole, attempts to beneficiate bauxites having substantial contents of siliceous or iron oxide impurities have been found to be quite impracticable, especially where a reasonably pure alumina is contemplated.

Moreover, and quite apart from contamination by siliceous or iron oxide content of the bauxite, various types have proved to be quite resistant to chemical treatment, either by acid or alkaline reagents. This comparative inertness has been manifested by monohydrated forms of bauxite or diaspore. In effect this type of alumina refractory material is considered essentially inert to acid reaction and comparatively impracticable in its meager response to treatment with alkaline reagents.

In brief, procedures of the prior art are comparatively involved as to the technical and manipulative details relied upon in their contemplated recovery from bauxites of alumina which is substantially free from such impurities as silica and iron oxide; and the efficiency of the recovery as well as the economy of operation are subject to a substantial improvement. Moreover, apart from the alumina obtained from the refractory material, the remaining ingredients thereof, including the silica and iron oxide content are to all intents and purposes waste material unadapted for expedient conversion to practicable substances or articles of manufacture.

It is an object of this invention to obviate such difficulties and uncertainties as hereinabove indicated.

Another object is to provide an expedient procedure for effectively beneficiating refractory materials available as sources of alumina.

An additional object is to attain a method for the facilitated recovery of substantially pure alumina from bauxites.

A further object is to beneficiate bauxites by solubilizing the alumina therein as an alkaline earth aluminate without affecting the insoluble status of the siliceous and ferruginous impurities present.

Another object is to produce a substantially pure alumina from a siliceous and/or ferruginous bauxite while expediently recovering essentially pure iron oxide.

An important object is a procedure for the expedient and facilitated separation from ferruginous and siliceous bauxites of substantially pure alumina, substantially pure magnetic iron oxide, and siliceous residue adapted for the production of articles of manufacture.

An added object of this invention is a facilitated method for solubilizing the alumina content of ferruginous bauxite without disturbing the insolubility of the siliceous or iron content thereof, separately recovering substantially pure alumina and magnetite, expediently removing the siliceous materials, and regenerating the reagents utilized in a cyclic procedure.

A significant object comprises a novel apparatus combination and system which is adapted to performing the procedural features described herein.

Other objects, advantages and features of the invention will become apparent from the following description read in connection with the accompanying drawings:

Fig. 1 is an apparatus combination of various devices adapted as a system or plant installation for the efficient recovery of substantially pure alumina and essentially pure magnetic iron oxide, and for the expedient separation of residual siliceous material while cyclically regenerating the reagents utilized.

Fig. 2 is drawn to a flow sheet representing the novel features of procedure including the cyclic details of operation.

It has been found within the purview of the invention that bauxites, irrespective of any substantial content of impurities therein such as iron oxides and silica, lend themselves to expedient chemical and physical treatment by an efficient, practical and facilitative procedure, as compared with the involved and uncertain processes of the prior art which have considered this type of refractory material as industrially impracticable and even useless, notwithstanding the high content of alumina which may be present. Fundamentally the concept of the invention is predicated upon the direct solubilization of the alumina content of the bauxite without disturbing the relatively insoluble characteristics of the silica and iron oxides present. This conversion of the aluminate to a soluble form is attained by chemically reacting the same with an alkaline reagent, desirably an alkaline earth oxide or carbonate, under conditions directed to forming an aluminate which is soluble in aqueous solution, these conditions precluding any alteration of the insolubility of the siliceous and ferruginous content. Moreover, the conditions of solubilizing the alumina are desirably such as to transform the iron oxides present into the form of magnetic iron oxides. In view of this conversion of the alumina and iron oxides present, their separation and removal as substantially pure products is essentially facilitated to the status of a simplified procedure. The ramifications of the invention include details of cyclic utilization and regeneration of the reagents contemplated by the procedure.

Illustrative of an optimum embodiment of the invention and the phenomena on which it is predicated, it has been ascertained that when bauxites are treated in the presence of an appropriate proportion of calcium oxide (CaO) or $CaCO_3$ at a temperature of approximately 1000° C., monocalcium aluminate ($Al_2O_3CaO$) is formed. It will be understood that the said temperature of approximately 1000° C. is subject to a reasonable latitude of variation in view of the practical aspects of commercial or plant operations and/or the characteristics of the reagents or materials utilized. The monocalcium aluminate thus formed has the property of being soluble in water or in suitable solutions, as a result of which it may be separated by dissolution from the insoluble residual material of the bauxite. It is particularly significant that at the temperature of approximately 1000° C., the silica content of the bauxite does not manifest any tendency to combine with an alkaline or alkaline earth base. This is quite differentiated from the results of treatment at a temperature of 1400° C. to 1500° C. pursuant to the usual procedures, which result in the formation of silicates corresponding with the alkali metal or alkaline earth reagent utilized. Accordingly, the heat treatment, pursuant to the present invention, namely, at a temperature of approximately 1000° C., obviates the danger of producing silicates corresponding with the alkaline or alkaline earth compound or base utilized, which silicates have prevented heretofore the utilization of siliceous bauxites. Moreover, and of material importance, at this temperature of approximately 1000° C., the oxides of iron are transformed into magnetic iron oxide, which lends itself to magnetic separation.

The procedure of the present invention essentially comprises treating the bauxite in the presence of the oxide or carbonate of calcium at a temperature of approximately 1000° C. in such manner as to produce monocalcium aluminate, and separating said monocalcium aluminate from the impurities, such as silica, iron, titanium, et cetera, by dissolving it in water or in any appropriate solvent. The said monocalcium aluminate may then be converted into sodium aluminate by reacting it with sodium carbonate, for example. The resultant sodium aluminate is in turn converted into hydrated alumina by the usual procedures.

Moreover, and pursuant to the invention, the oxides of iron which have been transformed by the thermal treatment into magnetic iron oxide, can be recovered by means of appropriate magnetic separators. Furthermore the preferred embodiment of procedure contemplates the stabilization of the magnetite, as with respect to obviating its reoxidation, as well as imparting to the insoluble materials resulting from the calcination treatment crystalline characteristics or at least avoiding the formation of colloidal compounds difficult to separate by filtration.

Referring more particularly to the features of the invention as indicated by the drawings herewith, which are intended to be illustrative of a preferred or optimum embodiment of the invention and not limiting as to the scope thereof, the following consideration of Fig. 1 is directed to further concise details of the optimum procedure and apparatus combination contemplated.

The ground bauxite is fed from any expedient conveyance into a measuring hopper 1 from which it is carried by a conveyor 2, which pours it into a millhopper mixer-grinder 3. Quick lime issuing from calcinator 27 is similarly supplied to mixer-grinder 3 through the intermediary of a measuring apparatus 4. The proportions of quick lime (CaO) to bauxite should correspond with the formula of monocalcium aluminate. Thus the proportion of CaO utilized is dependent on the $Al_2O_3$ content of the bauxite and corresponds to the aproximate range of from 0.5 to 0.6 part of CaO for 1 part of $Al_2O_3$ in the bauxite. As in the case of the calcination temperature, the proportioning of the bauxite and quick lime or calcium carbonate, with respect to the $Al_2O_3$ and CaO content of the reagents, is subject to reasonable variation dependent upon the characteristics of the materials utilized as well as the practical aspects of plant operation. Thus the amount of CaO to $Al_2O_3$ may for practical purposes even exceed the indicated approximate proportion of 0.6:1, and the fundamental consideration as indicated comprises the appropriate proportioning of the CaO to $Al_2O_3$ in the raw materials in order to produce the monocalcium aluminate without permitting any significant reaction between the CaO and the other ingredients present in the raw materials, such as the siliceous and ferruginous substances.

The mixture comprising the measured quantities of quick lime or limestone ($CaO_3$) and bauxite in said mixer-grinder 3 is poured into rotary kiln or furnace 6 which is heated to a temperature of approximately 1000° C., more or less within reasonable practical limits as affected by conditions of plant operation as well as the properties of the bauxite and lime or $CaCO_3$ utilized. The reactions which take place within the kiln result in the production of monocalcium aluminate and magnetic iron oxide. Thus, issuing from the outlet of the kiln is a mixture of monocalcium aluminate with magnetic iron oxides, and impurities initially present both in the bauxite and in the lime comprising particularly silica, titanium oxide, et cetera. This mixture issuing from the rotary kiln or furnace is at a temperature of approximately 1000° C., and it falls directly into cold water or cold alkaline solutions circulating in the lower part of a closed hopper 7. This results in the abrupt cooling or quenching of the incandescent mixture at a temperature of approximately 1000° C. within said closed reservoir 7, the said quenching involving the commencement of the dissolution of the monocalcium aluminate, while at the same time the magnetite, which is abruptly cooled, has been stabilized and is no longer susceptible to re-oxidation. Without intending to be restricted to any theory or explanation, this quenching of the substantially incandescent mass issuing from the kiln is believed to be of definite importance in connection with avoiding the formation of colloidal iron compounds or other colloidal insoluble materials, such as that of the residual insolubles other than the magnetite resulting from the aforesaid calcination treatment. Thus the insoluble materials formed by the calcination treatment manifest a crystalline form which renders them susceptible to expedient filtration from the solution of monocalcium aluminate, thereby enhancing the efficiency of operation both with respect to the expediency of separating the insolubles as well as from the standpoint of obviating excessive volumes of solutions including washing liquors or the like.

The conversion of iron oxides, and especially the sesquioxide of iron, into magnetic iron oxides within a rotary furnace has already been described, particularly in French Patent No. 850,789 of February 24, 1939, to De Vecchis. There is no necessity for any special precaution relative to the heating of the furnace, and this may be expediently effected by a gas burner 8. The conditions prevailing within the furnace may be an inert or oxidizing atmosphere, there being no need for creating a reducing atmosphere therein. The length of the furnace should be such that the mixture reaching the outlet thereof is at the desired temperature of approximately 1000° C., as hereinabove indicated.

The quenched mixture fallen into the water of hopper 7 is then automatically poured at predetermined intervals by means of any suitable feeding device into a ball mill 9, constituted as a closed autoclave. In this autoclave, superatmospheric pressure is maintained and the essentially complete dissolution of the monocalcium aluminate is effected, while the insoluble materials comprising the magnetite, silica, oxide of titanium and other impurities are finely pulverized.

The monocalcium aluminate solution, suitably concentrated, and containing insoluble materials in suspension, is then conducted to a filter-press 10 or any other equivalent type of apparatus provided with means for washing the filter cake, in order to reduce to a minimum the loss of aluminate in the sediment. The insoluble substances automatically fall through conduit 11 onto an electro-magnetic separator 12, which may desirably be of the type described in French Patent No. 890,279 of January 20, 1943, to De Vecchis, by way of example. This electromagnetic treatment permits the separation of the magnetic iron oxides, which is removed at 13 from the siliceous impurities separated at 14.

Concerning the solution of monocalcium aluminate, as it issues from filter-press 10, it is conducted through conduit 15 to mixer 16, wherein it is mixed with a solution of sodium carbonate, the latter being desirably obtained pursuant to the cyclic and regenerative features of the process as hereinafter described. The admixture of monocalcium aluminate and sodium carbonate results in the formation of sodium aluminate, with the precipitation of calcium carbonate.

The said aluminate solution containing the calcium carbonate in suspension is evacuated through conduit 17 into filter-press 18, or any other equivalent device adapted to effect facile separation of the solution from the precipitate. The solution of sodium aluminate issuing from filter-press 18 through conduit 19 is treated with carbon dioxide in carbonator 20, resulting in the regeneration of sodium carbonate in solution and the precipitation of aluminum hydrate.

The sodium carbonate solution and its aluminum hydrate suspension then pass into filter-press 21, or any equivalent means, such as a centrifuge, whereby the aluminum hydrate in substantially pure state is separated, and conducted by means 22 into a rotary calcination furnace 23 in order to be subjected to the usual treatment, such as its conversion to alumina.

Furthermore the solution of sodium carbonate, separated by filter-press 21, is desirably fed through conduit 24 into mixer 16, where it is admixed and reacted with additional monocalcium aluminate supplied from filter-press 10 through conduit 15, as described hereinabove.

Moreover the precipitated calcium carbonate which is separated from the sodium aluminate solution in filter-press 18 is desirably conducted by conduit 25 into any expedient drier 26, and thence into calcinator 27. The calcium carbonate is decomposed in said calcinator 27, resulting in the production of quick lime and carbon dioxide. The quick lime is delivered as aforesaid through appropriate measuring means into mixer-grinder 3, where it is admixed with a proportioned amount of ground bauxite which is to be subjected to treatment pursuant to the procedure of the present invention. On the other hand, the carbon dioxide formed in the kiln or calcinator 27 is evacuated through conduit 28 and conducted into carbinator 20, where the reaction producing aluminum hydrate and regenerating sodium carbonate takes place, as previously described. Thus the lime and the carbon dioxide gas are utilized in a closed cycle.

The apparatus combination involving the installation or system such as herein described and shown in Fig. 1 comprises an optimum embodiment of the invention adapted to afford maximum efficiency in operation and recovery of the various products utilized, and it should be apparent that various modifications may be resorted to without departing from the scope of the invention.

The details of the preferred embodiment of the process as described hereinabove in connection with the consideration of Fig. 1 of the drawing are concisely presented by the flow sheet of Fig. 2. Thus ground bauxite of any desired type and quick lime from any predetermined source are separately measured to provide a relative proportion corresponding with approximately 0.5 to 0.6 part of CaO for one part of $Al_2O_3$. The measured amounts of these substances may desirably be supplied to a combination grinder and mixer, wherein the bauxite and CaO are thoroughly admixed and interground according to preference. The proportioned mixture is then conducted to a rotary furnace or kiln wherein it is calcined at a temperature of approximately 1000° C. to convert the alumina content of the bauxite into monocalcium aluminate; and the iron oxide content of the bauxite is at the same time transformed to magnetic iron oxide, otherwise known as magnetite.

The incandescent calcined mass at a temperature of approximately 1000° C. is then abruptly quenched by immersion in a cold aqueous solution, such as cold water or an aqueous solution of an alkali metal carbonate or hydroxide illustrated by sodium carbonate and/or caustic soda solution. In addition to cooling the mass, this quenching treatment results in stabilizing the magnetic iron oxides, presumably by preventing its contact with air until it has been appropriately cooled, and in addition some solution of the monocalcium aluminate takes place.

Following the quenching treatment, the mixture of materials comprising the solution and insoluble or undissolved material is all conducted to a ball mill and autoclave combination wherein the mass is subjected to superatmospheric conditions of treatment, the temperature desirably being such as to afford maximum solubility of the monocalcium aluminate. Upon complete solution of the monocalcium aluminate, the mass is delivered to any appropriate filter-press or its equivalent, whereby the solution of monocalcium aluminate is separated from the insoluble material which comprises magnetic iron oxides, silica, titanium oxide, and other insoluble constituents of the lime and bauxite initially introduced into the process. In order to effect a maximum separation of the monocalcium aluminate from the insoluble material, the filter cake is subjected to a washing treatment with an appropriate solution, such as water or an aqueous alkaline solution.

The separated solution of monocalcium aluminate, conducted to a mixing device from the filter-press, is admixed with a solution of sodium carbonate, which comprises a reagent cyclically utilized and regenerated pursuant to the details of the procedure, as will appear from the description hereinbelow. This treatment of monocalcium aluminate with sodium carbonate results in the reaction forming a solution of sodium aluminate and a precipitate of calcium carbonate. The sodium aluminate solution containing the $CaCO_3$ in suspension is subjected to appropriate filtration, whereby the sodium aluminate solution and $CaCO_3$ are separated.

The sodium aluminate solution is then conducted to a carbonation zone, wherein it is desirably treated with carbon dioxide, thereby forming sodium carbonate in solution and a precipitate of aluminum hydrate. The sodium carbonate solution may be effectively removed from the aluminum hydrate precipitate by any expedient filtering procedure or by subjecting the mixture to centrifuge separation. The aluminum hydrate thus obtained comprises a fundamental product of the inventive procedure herein, since it is in pure or substantially pure state. This aluminum hydrate may be treated pursuant to the practice in the art for conversion to alumina, as by an appropriate calcination treatment, the resultant alumina being likewise pure or substantially pure and adapted for any desired commercial use.

The sodium carbonate solution from which the aluminum hydrate has been removed is preferably reutilized by conducting the same to the mixing zone to which monocalcium aluminate formed in the process is delivered, subsequently to its separation from the insoluble materials of bauxite. Thus the cyclic aspects of the sodium carbonate solution are clearly indicated in its use to convert the monocalcium aluminate to sodium aluminate, with the latter being converted by carbonation to aluminum hydrate, while the sodium carbonate solution at the same time is regenerated.

Similarly the calcium carbonate in effect lends itself to cyclic adaptation and regeneration. Thus referring again to the stage hereinabove at which the sodium aluminate solution and calcium carbonate precipitate are formed, followed by their separation through the expedient of a filter-press, the calcium carbonate is desirably directed to any expedient type of drier, following which it may be delivered to the calcinator for decomposing the calcium carbonate to quick lime, the preferred reagent for admixture with the initial ground bauxite.

The decomposition of calcium carbonate in the calcinator results in the evolution of carbon dioxide gas, and this gas is expediently conducted to the carbonation zone hereinabove referred to for converting the sodium aluminate solution to aluminum hydrate, while sodium carbonate is regenerated. It will accordingly be seen that the primary reagents of the procedure may be referred to as quick lime or calcium carbonate, carbon dioxide and sodium carbonate. In view of the closed cyclic adaptation of these reagents, it is fundamentally unnecessary to add them to the procedure after it has been initiated, except for making up losses which are more or less inevitable in any industrial operation.

As for the above described insoluble material which has been separated from the monocalcium aluminate during the course of the procedure, and comprising magnetic iron oxides, silica, titanium oxides, etc., by subjecting the same to electromagnetic separation, substantially pure magnetic iron oxides is obtained on the one hand, while the residual material comprises the aforesaid silica, titanium oxide and other impurities.

As previously indicated, in view of the purity of the alumina, it may be adapted for any desired use as such or by subsequent conversion, such as its reduction to the metal state for the manufacture of aluminum articles. Relative to the magnetic iron oxides, in view of its essentially pure state, it is adapted for the manufacture of high quality metallurgical products. For example, the magnetic iron oxides may be treated for the purpose of manufacturing high quality castings as described in the previously referred to French Patent No. 850 789 to De Vecchis. This may be accomplished by successively reducing magnetite in a rotary reducing furnace followed by a reverberatory fusion furnace, where the fusion and the carburizing of the casting is effected. Other adaptations of the said magnetite are indicated in the said French Patent No. 850,789. With regard to the siliceous impurities comprising a mixture of silica with titanium oxide and other insoluble materials originally present in the bauxite and lime, this may be dried and subsequently pulverized for use in the manufacture of such products as electrodes, anti-rust or rust-inhibiting varnish, abrasives, etc.

As in the case of the various changes and substitutions applicable to the apparatus combination or plant installation described without departing from the sphere of the invention herein, it will be apparent that the optimum embodiment of the procedure may be varied as to its ramifications without deviating from the scope, concept or essence of the invention. For example, other alkaline earth reagents than calcium carbonate or calcium oxide may be utilized in the zone of bauxite calcination and conversion of the alumina content to a soluble form. The primary requisite relative to the alkaline reagent utilized in connection with the calcination of the bauxite, said alkaline reagent being either the alkali metal or alkaline earth metal type, is that the proportion thereof should under no conditions comprise any excess or be sufficient to react with the impurities present, such as the $SiO_2$, and that it is merely sufficient to convert the alumina to a soluble form. In addition, the alkaline reagent is desirably such as to permit calcination at a temperature for transforming the iron oxides present to the form of magnetic iron oxide.

Likewise the bauxites or alumina bearing refractory materials utilized may be subjected to substantial variation in view of the wide and advantageous adaptation of the invention to bauxites generally, notwithstanding its optimum application to high ferruginous and/or siliceous species of the mineral. Thus the invention is applicable to aluminum containing refractory materials, such as bauxites, whether they are high or low in their alumina content, and generally irrespective of their content of impurities, such as silica and iron oxide; and advantages of procedure are attainable with respect to bauxites or other alumina refractories, which have been heretofore considered to be unduly resistant to alkaline treatment.

Similarly the quenching liquid need not be restricted to cold water or water at prevailing atmospheric temperatures, such as that issuing from the tap, since aqueous alkaline solutions are adaptable for similar use, such solutions being illustrated by the alkali metal carbonates and hydroxides, such as an aqueous solution of $Na_2CO_3$ and/or $NaOH$. While the alkaline solutions may react with the monocalcium aluminates as well as satisfy the quenching function, it will be clear that such reaction does not conflict with the fundamentals of the procedure described since, as disclosed, such alkaline treatment of the monocalcium aluminate is imminent in the process to form an alkali metal aluminate solution, which is separated from the residual material containing the magnetic iron oxides and silica. In fact any suitable solvent may be resorted to for separating the monocalcium aluminate by its dissolution from the insoluble material, with the proviso that the fundamental reactions of the process disclosed are not affected by the said solvent or that it is essentially inert to the various reactions involved in the procedure.

Furthermore, while the temperature of approximately 1000° C. manifests critical significance, this may be subject to reasonable variation within the skill of one versed in the art. Thus dependent upon the conditions of operation as affected by the characteristics of the raw materials utilized, the temperature may be increased up to as much as approximately 1100° C., or reduced below 1000° C. to a similar extent, without altering the features of forming the soluble aluminate and converting the iron oxides present to the magnetic oxide state.

It will accordingly be seen that pursuant to the invention a novel procedure is afforded for the effifficient and facilitated recovery of aluminum compounds from refractory materials containing the same. The features of the invention are illustrated by the following attributes, among others:

1. The recovery of substantially pure alumina from bauxites or other refractory materials which have been heretofore considered to be impracticable or useless.

2. The effective direct solubilization of the alumina content in the refractory material containing the same without altering the insolubility of the other substances present, including the siliceous and ferruginous compounds, and the expedient removal of the solubilized alumina from these impurities by extraction as a limpid solution.

3. The increased procedural efficiency by in effect rendering possible the equivalent of a substantially continuous operation, as a result of minimizing the difficulty in separating impurities, such as colloidal siliceous or ferruginous compounds.

4. The improved economy of operation, especially where high ferruginous bauxites are utilized, in view of the expedient solubilization of the alumina and the simultaneous conversion of the iron oxides to the form of magnetic iron oxide, without resort to reducing conditions involving the addition of solid or gaseous agents, together with the expedient electromagnetic separation of the iron oxide in the form of substantially pure magnetite, while the other so-called impurities are segregated essentially in a condition adapted for use as practical by-products.

5. The cyclic features of reagent utilization and regeneration in connection with the procedural advantages as in 4.

In summary the invention affords many attributes and advantages not heretofore attainable in the beneficiation of refractory materials available as a source of alumina. These attributes and advantages pertain both to the expediency, efficiency and economy of operation, as well as to the apparatus combination or plant installation adapted for attaining the procedural features disclosed.

While the invention has been described in accordance with optimum embodiments and adaptations, as previously indicated, it is obvious that many changes and modifications may be made in the details of procedure, and in the devices utilized per se as well as in the combinative system or installation, without departing from the spirit of the invention as defined in the following claims.

Having thus set forth our invention, we claim:

1. The process of beneficiating insoluble refractory materials available as a source of alumina and containing siliceous and ferruginous material among its insoluble impurities which comprises calcining said refractory materials in the presence of a basic alkaline earth compound adapted to form a water soluble aluminate, the proportion of said alkaline earth compound and the alumina being approximately equimolar, and the amount of said alkaline earth compound corresponding with that sufficient for producing the said water soluble aluminate without reacting with the impurities of the mineral, the calcination temperature being approximately 1000° C. and adapted to react said alkaline earth compound and alumina to form said soluble aluminate substantially without any collateral reaction between the said alkaline earth reagent and the insoluble impurities, quenching the hot calcined mass in a relatively cold aqueous solution and completing the dissolution of the aluminate from the residual magnetic iron oxide containing material, and then separating the aluminate solution from the residual insoluble material.

2. The process of beneficiating a mineral containing insoluble aluminum values as a source of aluminum and insoluble siliceous impurities which comprises mixing the said mineral with a basic alkaline earth reagent adapted to form with said aluminum values a substantially water-soluble aluminate compound, the proportion of the alkaline earth reagent being substantially equimolar relative to the alumina content of the mineral, the quantity of said alkaline earth reagent being sufficient to react with the content of aluminum values in the mineral to form a water-soluble aluminate and insufficient to react with the said siliceous impurities, calcining said mixture at a temperature of approximately 1000° C. which will form the said soluble aluminate and below that which will permit any substantial reaction between said alkaline earth reagent and said siliceous impurities, subjecting the calcined mass to grinding treatment in the presence of an aqueous solution for dissolving the aluminate content, and removing the said aluminate compound from the insoluble siliceous impurities.

3. The method of recovering alumina from siliceous and ferruginous bauxites which comprises admixing with said bauxite a basic alkaline earth reagent in approximately equimolar proportion relative to the alumina content and merely sufficient for forming a water soluble alkaline earth aluminate with essentially all of the alumina content of the bauxite, calcining said mixture at a temperature of approximately 1000° C., said temperature being adapted to react said basic reagent and alumina to form said water soluble aluminate and to convert the ferruginous materials to the form of magnetic iron oxide substantially without any collateral reaction between the said alkaline earth reagent and the siliceous and ferruginous content of the bauxite, subjecting the calcined mass to grinding treatment in an aqueous solution at a temperature adapted to dissolve the aluminate, thereby extracting the water soluble aluminate from the calcined mass, separating the same from the residual insoluble material containing magnetic iron oxides, and converting said aluminate to aluminum hydrate.

4. The process of beneficiating insoluble refractory materials and minerals available as a source of alumina and containing iron oxides among their insoluble impurities which comprises calcining said refractory material in the presence of an alkaline earth reagent adapted to form a substantially water-soluble aluminate compound, the proportion of said alkaline earth reagent and the alumina content of the refractory material being approximately equimolar, the amount of said alkaline earth reagent being sufficient to react merely with substantially all the alumina content of the refractory material and insufficient to combine with the iron compounds and insoluble impurities therein, the calcination temperature being approximately 1000° C., the said temperature being adapted to form the said aluminate and to convert the iron oxides to the magnetic iron oxide state substantially without any collateral reaction between the said alkaline earth reagent and the insoluble impurities, subjecting the calcined mass to grinding treatment in the presence of an aqueous solution for dissolving the aluminate content, removing the solution from the insoluble residual material containing magnetic iron oxides, and converting the aluminate content of the solution to substantially pure aluminum hydrate.

5. The method as in claim 3, wherein the basic alkaline earth reagent is a substance from the group consisting of calcium oxide and limestone and the proportion of said reagent to alumina is in the approximate range of 0.5 to 0.6 part of calcium oxide for one part of alumina.

6. The method of recovering alumina from siliceous and ferruginous bauxites which comprises admixing with said bauxite a substance from the group consisting of an alkaline earth oxide and an alkaline earth carbonate in substantially equimolar proportion relative to the alumina content of the bauxite essentially sufficient for forming a water-soluble alkaline earth aluminate without reacting with impuriites in the bauxite, calcining said mixture at a temperature of about 1000° C. to form said water-soluble aluminate and to convert the ferruginous materials to the form of magnetic iron oxides, quenching the hot calcined mass in a substantially cold aqueous solution, subjecting the quenched mass including the aqueous solution to grinding treatment at a temperature adapted to dissolve the water soluble aluminate from the resultant insoluble mass, separating the aluminate solution from the residual insoluble material containing magnetic iron oxides, and converting said aluminate solution to alumina.

7. The method of recovering alumina iron oxide from siliceous and ferruginous bauxites which comprises admixing with said bauxite a substance from the group consisting of calcium oxide and calcium carbonate in substantially equimolar proportion relative to the alumina content of the bauxite and sufficient to form monocalcium aluminate and essentially insufficient to react with the siliceous and ferruginous materials present, calcining said mixture at approximately 1000° C. to produce the said monocalcium aluminate and to convert the ferruginous materials to the form of magnetic iron oxide substantially without any collateral reaction between the said calcium carbonate and the siliceous and ferruginous content of the bauxite, directly quenching the hot calcined mass in a relatively cold aqueous solution, grinding the said monocalcium aluminate from the calcined mass in the presence of the solution resulting from the said quenching treatment at a temperature adapted to dissolve said aluminate, filtering the resultant extracted mass, electromagnetically separating the magnetic iron oxide from the residual insoluble material, converting the monocalcium aluminate solution to aluminum hydrate, and converting the latter to alumina.

8. The method of recovering alumina iron oxide from siliceous and ferruginous bauxite which comprises admixing with said bauxite calcium oxide in substantially equimolar proportion relative to the alumina content of the bauxite and sufficient to form monocalcium aluminate and essentially insufficient to react with the siliceous and ferruginous materials present, calcining said mixture at approximately 1000° C. to produce the said monocalcium aluminate and to convert the ferruginous materials to the form of magnetic iron oxide substantially without any collateral reaction between the said calcium oxide and the siliceous and ferruginous content of the bauxite, directly quenching the hot calcined mass in a relatively cold aqueous solution, grinding the said monocalcium aluminate from the calcined mass in the presence of the solution resulting from the said quenching treatment, filtering the resultant extracted mass, electromagnetically separating the magnetic iron oxide from the residual insoluble material, converting calcium aluminate solution to aluminum hydrate and converting the latter to alumina.

9. The method as in claim 7, wherein the quenching solution is an alkali metal carbonate.

10. The method of recovering alumina and iron oxide from siliceous and ferruginous bauxites which comprises admixing with said bauxite a basic alkaline earth compound in approximately equimolar proportion relative to the alumina content and sufficient only to form with the alumina a water soluble aluminate, said proportion being insufficient to react with the siliceous and ferruginous materials present, calcining said mixture at a temperature of approximately 1000° C. sufficient to react said basic reagent and alumina to form said water soluble aluminate and adapted to convert the ferruginous material to the form of magnetic iron oxide, substantially without any collateral reaction between the said alkaline earth reagent and the siliceous and ferruginous content of the bauxite, quenching the hot calcined mass in a substantially cold aqueous solution, subjecting the quenched mass including the aqueous solution to grinding treatment at a temperature and pressure adapted to dissolve said aluminate from the residual insoluble material containing magnetic iron oxide, electro-magnetically separating the magnetic iron oxide from said residual material, and converting the extracted aluminate including aqueous solution resulting from the aforesaid quenching treatment to substantially pure alumina.

11. The method of recovering alumina and iron oxide from siliceous and ferruginous bauxite which comprises admixing with said bauxite an alkaline earth oxide in proportion corresponding with that sufficient for forming a water soluble aluminate with the alumina contained in said bauxite and insufficient to react with the siliceous and ferruginous materials, calcining said mixture at a temperature of approximately 1000° C. sufficient to react said alkaline earth reagent and alumina to form said water soluble aluminate, the temperature of said calcination being adapted to convert the ferruginous materials into magnetic iron oxides substantially without any collateral reaction between the said alkaline earth reagent and the siliceous and ferruginous content of the bauxite, quenching the hot calcined mass in a substantially cold aqueous solution, subjecting the quenched mass including the aqueous solution to grinding treatment at a temperature adapted to dissolve the aluminate, thereby extracting the water soluble alkaline earth aluminate from the insoluble residual material containing the magnetic iron oxides, electro-magnetically removing magnetic iron oxides from said residual material, reacting said alkaline earth aluminate solution including aqueous solution resulting from the aforesaid quenching treatment with an alkali metal carbonate solution to form alkali metal aluminate and alkali earth carbonate, carbonating said alkali metal aluminate to form aluminum hydrate and to regenerate alkali metal carbonate, and recycling the said alkali metal carbonate.

12. The method of recovering substantially pure alumina and substantially pure iron oxide from siliceous and ferruginous bauxite which comprises admixing with said bauxite quick lime in substantially equimolar proportion relative to the alumina content of the bauxite, the said proportion being restricted to and sufficient for forming water soluble monocalcium aluminate, calcining said mixture at approximately 1000° C., said temperature being adapted to react said quick lime and alumina to form said water soluble aluminate and to convert said ferruginous material to magnetite, subjecting the calcined mass to grinding treatment in an aqueous solution at a temperature adapted to dissolve the aluminate, thereby dissolving said monocalcium aluminate from the residual insoluble material containing magnetic iron oxides, subjecting said residual insoluble material to electro-magnetic separation for removing magnetic iron oxides therefrom, reacting said monocalcium aluminate with sodium carbonate to form sodium aluminate and calcium carbonate, decomposing said calcium carbonate for regenerating quick lime and producing carbon dioxide, subjecting the sodium aluminate to treatment with carbon dioxide for forming aluminum hydrate and sodium carbonate, calcining said aluminum hydrate to form substantially pure alumina, recycling said sodium carbonate for reaction with additional monocalcium aluminate, conducting the carbon dioxide formed by the decomposition of calcium carbonate for the carbonation of sodium aluminate, and admixing the regenerated quick lime for reaction with additional bauxite.

13. The method of recovering substantially pure alumina and substantially pure iron oxide from siliceous and ferruginous bauxite which comprises admixing with said bauxite CaO in the approximate proportion of 0.5 to 0.6 part of CaO for 1 part of $Al_2O_3$ in said bauxite, calcining said mixture at a temperature of approximately 1000° C., quenching in a cold aqueous solution the resultant essentially incandescent mass at said temperature of approximately 1000° C., subjecting said quenched mass including the aqueous solution to grinding treatment in an autoclave at superatmospheric conditions for dissolution of the undissolved monocalcium aluminate, separating the extracted monocalcium aluminate from the residual insoluble material, removing magnetite from said residual insoluble material by electro-magnetic separation, reacting said monocalcium aluminate with sodium carbonate to form sodium aluminate and calcium carbonate, decomposing said calcium carbonate to regenerate quick lime and carbon dioxide, subjecting the sodium aluminate to carbon dioxide treatment for forming aluminum hydrate and sodium carbonate, calcining said aluminum hydrate to form substantially pure alumina, recycling said sodium carbonate for treatment of additional monocalcium aluminate, recycling the quick lime formed in decomposing the calcium carbonate by admixing the same with additional bauxite, and recycling the carbon dioxide formed on decomposition of the calcium carbonate by passing said carbon dioxide into additional sodium aluminate for producing additional aluminum hydrate.

INEO DE VECCHIS.
OSCAR E. RAMUZ.

References Cited in the file of this patent

UNITED STATES PATENTS

| Number | Name | Date |
| --- | --- | --- |
| 618,772 | Blackmore | Jan. 31, 1899 |
| 1,930,271 | Heiser | Oct. 10, 1933 |
| 1,895,580 | Martin | Jan. 31, 1933 |
| 2,141,132 | Folger | Dec. 20, 1938 |
| 2,248,826 | Seailles | July 8, 1941 |
| 2,283,849 | Coles | May 19, 1942 |